United States Patent [19]

Pollak

[11] 4,225,124
[45] Sep. 30, 1980

[54] MECHANISM FOR TRANSFORMING A TRANSLATION MOVEMENT INTO A ROTATION MOVEMENT FOLLOWED BY A TRANSLATION MOVEMENT, AND APPLICATIONS OF THE MECHANISM

[75] Inventor: Mirko Pollak, Paris, France
[73] Assignee: Tobler S.A., Montrouge, France
[21] Appl. No.: 876,036
[22] Filed: Feb. 7, 1978
[51] Int. Cl.² .......................... F16H 25/08; B25B 5/08
[52] U.S. Cl. ........................................ 269/234; 74/55; 74/89; 269/32; 269/196
[58] Field of Search ............... 74/24, 55, 56, 89, 99 R, 74/99 A, 838, 839; 30/220, 209; 241/262, 267, 269, 272, 205; 269/234, 196, 32

[56] References Cited

U.S. PATENT DOCUMENTS

| | | | |
|---|---|---|---|
| 2,856,781 | 10/1958 | Forbes | 74/56 |
| 2,944,431 | 7/1960 | Dexter | 74/89 |

FOREIGN PATENT DOCUMENTS 530982  11/1976  U.S.S.R. ...................................... 74/56

Primary Examiner—Kenneth Dorner
Assistant Examiner—Moshe I. Cohen
Attorney, Agent, or Firm—Haseltine, Lake & Waters

[57] ABSTRACT

A mechanism for transforming a translation movement into a rotation movement which is then followed by a translation movement comprising a first member which can be a control member slidable on a smooth shaft and constituted by a hollow cylinder coaxial with the shaft, and terminated by two planar symmetrical faces which are inclined with respect to the shaft, and a second member which can be a driven member and fixed to the shaft. The second member is constituted by two hollow cylinders coaxial with the shaft and of the same diameter as the control member. Each hollow cylinder terminates with a planar face having the same inclination with the shaft as the faces of the control member, the planar faces of the hollow cylinders being in contact with respective faces of the control member. The two planar faces of the driven member are angularly offset relative to one another.

7 Claims, 5 Drawing Figures

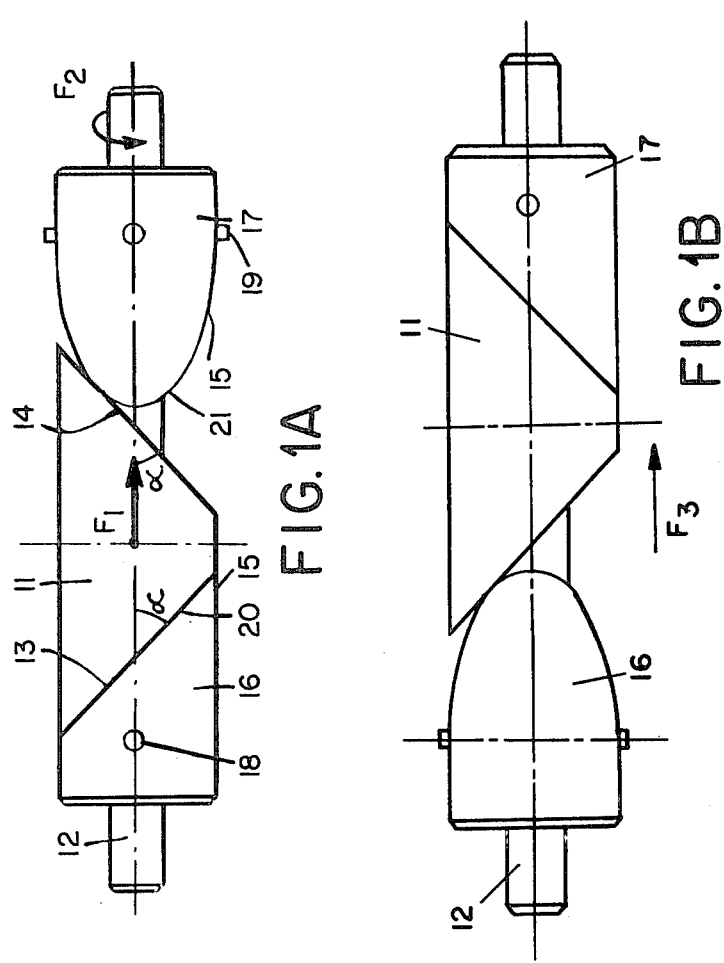
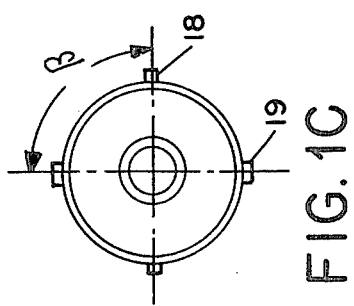

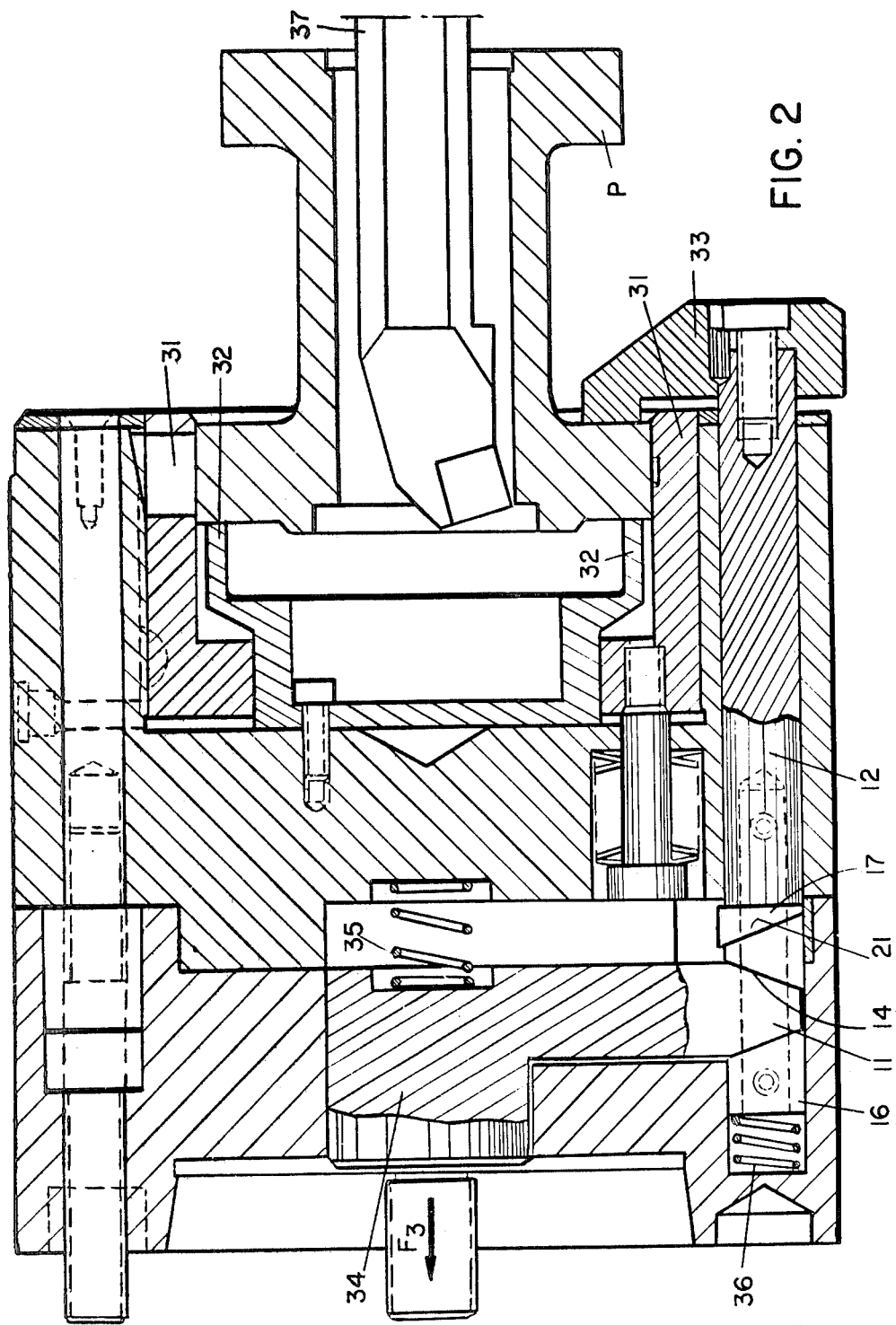

MECHANISM FOR TRANSFORMING A TRANSLATION MOVEMENT INTO A ROTATION MOVEMENT FOLLOWED BY A TRANSLATION MOVEMENT, AND APPLICATIONS OF THE MECHANISM

FIELD OF THE INVENTION

The present invention relates to a mechanism which transforms a translation movement into a rotation which can then be followed by a translation, and to the use of said mechanism, particularly but not exclusively for clamping devices such as the jaws of machine tools.

BACKGROUND

In a clamping device the locking fingers or jaws are initially moved aside in order to permit the positioning of the workpiece and then they are brought into the engagement position and locked against the workpiece. The procedure takes place in the reverse order for removing the treated workpiece.

SUMMARY OF THE INVENTION

An object of the invention is to provide a mechanism which makes the successive movements possible as the result of a single displacement of a control member in a reliable and economic manner.

In brief, the mechanism according to the invention comprises a control member (which can also be a controlled member) which slides on a smooth shaft and which comprises a hollow cylinder coaxial with said shaft and terminated by two planar symmetrical faces forming an angle of inclination $\alpha$ with respect to said shaft, and a driven member (which can also be a driving member) which is fixed to said shaft and which comprises two hollow cylinders which are coaxial with said shaft and are of the same diameter as the control member, each hollow cylinder terminating with a planar face having the same angle of inclination $\alpha$ with respect to said shaft, said planar faces being in contact with respective planar faces of the control member, said two planar faces of the driven member being angularly displaced relative to one another by an angle $\beta$.

Thus, between the two positions where the control member is in planar contact with one of the other face of the driven member, the mechanism according to the invention transforms a translation movement of the control member into a rotation of angle $\beta$ of the driven member and also joins the driven member and the shaft to the control member.

It should be noted that the free choice of the angle $\alpha$ makes it possible to vary the travel of the control member which rotates the driven member by the angle $\beta$ and that the free choice of the angle $\beta$ makes it possible to vary the rotation of the driven member.

Moreover, and due to the fact that it is a question of relative movements between the members, the mechanism according to the invention can have a general movement, for example a pivotal movement about a transverse axis.

BRIEF DESCRIPTION OF THE DRAWINGS

The mechanism according to the invention and its applications will be described hereinafter relative to nonlimitative embodiments and with reference to the attached drawings:

FIG. 1A diagrammatically shows the mechanism according to the invention in one position of operation;

FIG. 1B diagrammatically shows the mechanism in a second position of operation;

FIG. 1C is an end view of the mechanism as seen in the direction of arrow F in FIG. 1A, FIG. 2 is an axial sectional view through one of the jaws of a machine tool according to the invention.

DETAILED DESCRIPTION

Figure 3:
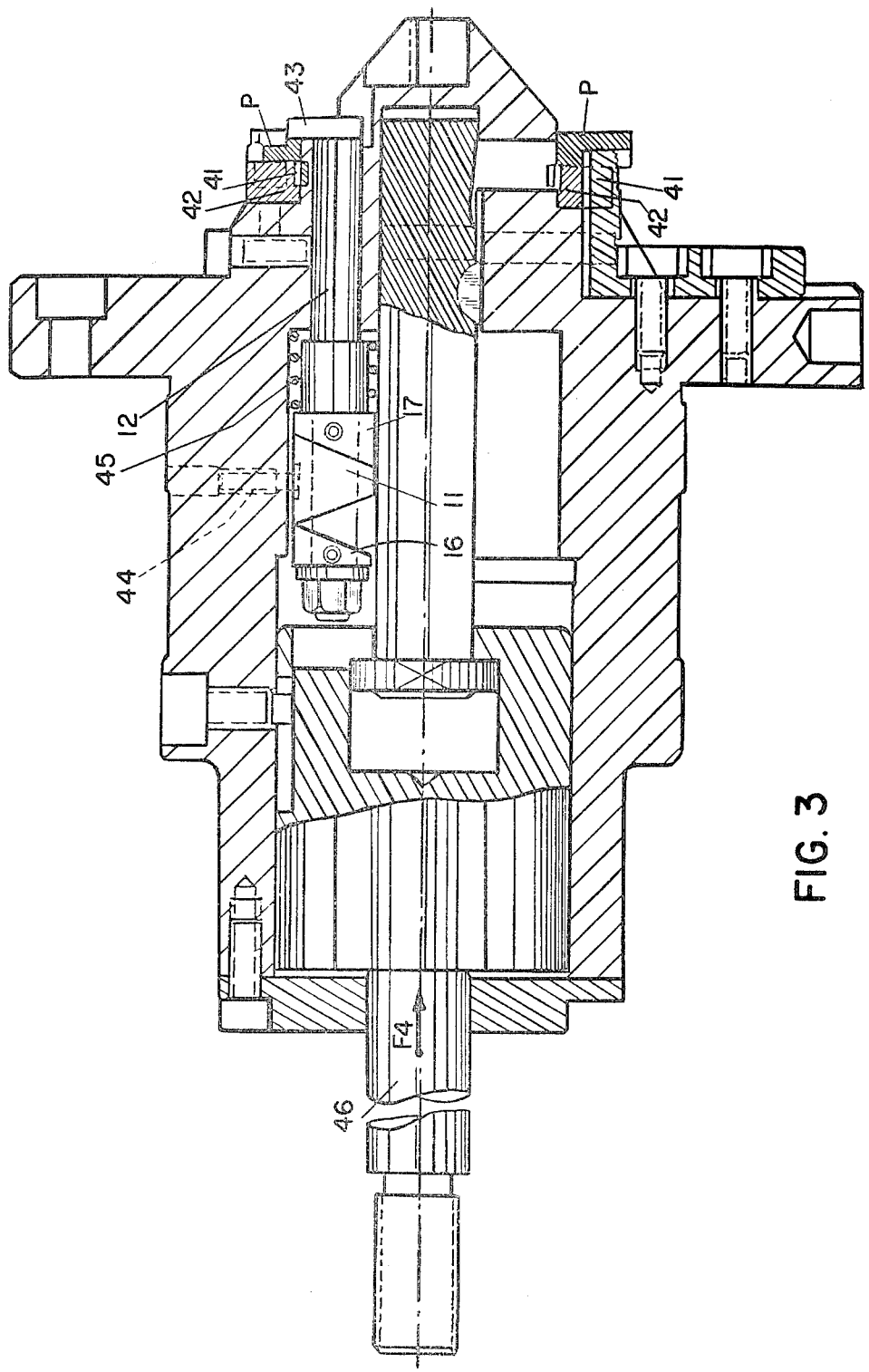
FIG. 3 is an axial sectional view of another machine tool according to the invention.

In FIGS. 1A–1C the mechanism according to the invention comprises a control member 11, which slides on a smooth shaft 12 and which is constituted as a hollow cylinder coaxial with the shaft and terminated by two inclined planar symmetrical faces 13, 14 forming an angle $\alpha$ with respect to shaft 12. Faces 13 and 14 are shown in end view in FIG. 1A. The mechanism according to the invention further comprises a driven member 15 which is constituted by two identical hollow cylinders 16, 17 coaxial with shaft 12 and joined thereto, for example, by keys 18, 19. The cylinders 16, 17 are of the same diameter as control member 11, each terminating by a planar face 20, 21 of the same inclination $\alpha$ with respect to shaft 12, but offset in rotation relative to one another by an angle $\beta$. Face 20 (end view in FIG. 1A) is in contact with face 13 of control member 11 and face 21 (profile view in FIG. 1A) is in contact with face 14 of control member 11.

FIG. 1A shows the mechanism in the position where the control member 11 is in planar contact at the left with the driven member 15 (planar contact of faces 13 and 20) and in FIG. 1B where the control member 11 is in planar contact at the right with the driven member 15 (planar contact of faces 14 and 21). Starting from the position in FIG. 1A and due to the relative positioning of faces 14 and 21, a translation to the right of control member 11 (arrow F1) produces rotation of driven member 15 (arrow F2), for example, by point contact support of planar faces 14 and 21 and planar faces 13 and 20. This continues until planar contact takes place between faces 14 and 21 due to a rotation through angle $\beta$ of the driven member 15 and shaft 12. Then said planar contact between faces 14 and 21 joins together control member 11 and driven member 15 which is then driven in translation (arrow F3), as well as shaft 12 by the translation of the control member 11.

The advantages of the construction according to invention are obvious: simplicity of shape and machining, precision of rotation, robustness, impossibility of locking and also interference. It will be evident to one skilled in the art that the faces of the planar and oblique sections of the hollow cylinders can be cut radially so as to improve the working surfaces between the cylinders and consequently increase the transmitted forces, whereby there is a small tolerance between the cylinders in order to compensate for variations in the radius of the working surfaces.

FIG. 2 is an axial section taken through one of the jaws (for example three jaws) of an embodiment of the invention applied to internally a machine tool 37 which is to machine a workpiece P. Therein can be seen the control member 11, shaft 12, and driven members 16, 17 of the mechanism described with reference to FIG. 1. FIG. 2 shows workpiece P secured in a guide 31 against a support 32 by jaws 33 mounted at the end of shaft 12, the control member 11 being drawn in the direction of arrow F3 by clamp 34. A weak release spring 35 is optimal.

In order to release workpiece P, it is merely necessary to discontinue the tension of clamp 34. A spring 36 (which is necessarily stronger than spring 35) forces shaft 12 back which, after a travel corresponding to the tolerances between faces 14 and 21 by translation and rotation moves jaws 33 aside.

FIG. 3 is a section similar to FIG. 2 in the case of a different application of the invention where it is once again possible to see member 11, shaft 12 and members 16, 17. FIG. 3 shows workpiece P secured in a guide 41 against a support 42 by jaws 43 mounted at the end of shaft 12. In this embodiment, member 11 is fixed by being joined to the machine frame by a pin 44 and fastening takes place by a spring 45 which forces the driven members 16, 17 back.

In order to free workpiece P, it is merely necessary to apply thrust to the clamp 46 (in the direction of arrow F4). Following a travel corresponding to the tolerance between said clamp and shaft 12, members 16, 17 rotate by being engaged with fixed member 11 and jaws 43 move aside by translation and rotation.

What is claimed is:

1. A mechanism for transforming a translation movement into a rotation movement followed by a translation movement, said mechanism comprising a smooth shaft, a first member slidably mounted on said shaft, said first member being constituted by a hollow cylinder coaxial with said shaft, and having two end faces which are planar and symmetrical and form an angle of inclination with respect to said shaft, and a second member fixed to said shaft and constituted by two cylinders coaxial with said shaft, each cylinder of the second member having a planar face of the same inclination with respect to said shaft as said end faces of the first member, each planar face of the cylinders of the second member facing a respective inclined planar face of the first member for contacting the same, said two planar faces of the hollow cylinders member being angularly offset with respect to one another.

2. A mechanism according to claim 1, having a pivoting movement around a transverse axis.

3. A mechanism according to claim 1 for locking and unlocking the jaws of a machine wherein the jaws are mounted at the end of said shaft, a clamp member being fixed to said first member, spring means acting on said shaft in a direction to release the jaws and means for tightening the jaws by applying tension on the clamp member.

4. A mechanism according to claim 1 for locking and unlocking the jaws of a machine wherein the jaws are mounted at the end of said shaft, means fixedly securing said first member, spring means for yieldably securing said second member and clamp means supported on said second member for releasing the jaws by application of pressure on said clamp means.

5. A mechanism according to claim 1 wherein said cylinders of said second member are angularly offset by 90°.

6. A mechanism according to claim 1 wherein the cylinders of the first and second members have the same diameter.

7. A mechanism according to claim 1 wherein said cylinder of the first member is interposed between the cylinders of the second member such that the planar face of a first of the cylinders of the second member is aligned with the facing planar surface of the cylinder of the first member while the planar face of the second of the cylinders of the second member is angularly offset from the facing planar surface of the clyinder of the first member such that when the cylinder of the first member is slidably moved in one direction, the planar face thereof which is angularly offset from the facing surface of said second cylinder of the second member contacts said face to cause said second cylinder of the second member to be rotated which produces rotation of the shaft in one direction resulting in rotation of the first cylinder by an equal amount, slidable movement of the cylinder of the first member in the opposite direction producing rotation of the first cylinder of the second member in reverse direction to its original position.

* * * * *